(12) United States Patent
Xiong

(10) Patent No.: US 8,699,244 B1
(45) Date of Patent: Apr. 15, 2014

(54) ELECTRONIC BALLAST WITH LOAD-INDEPENDENT AND SELF-OSCILLATING INVERTER TOPOLOGY

(75) Inventor: Wei Xiong, Madison, AL (US)

(73) Assignee: Universal Lighting Technologies, Inc., Madison, AL (US)

( * ) Notice: Subject to any disclaimer, the term of this patent is extended or adjusted under 35 U.S.C. 154(b) by 402 days.

(21) Appl. No.: 12/915,317

(22) Filed: Oct. 29, 2010

(51) Int. Cl.
    *H02M 5/45* (2006.01)
(52) U.S. Cl.
    USPC .............................................. 363/37; 315/224
(58) Field of Classification Search
    USPC ........... 363/17–20, 25, 26, 71–76, 95–98, 79, 363/132; 323/222, 223, 224, 266, 271, 289; 315/224, 226, 244, 291, 247, 307, 219
    See application file for complete search history.

(56) References Cited

U.S. PATENT DOCUMENTS

| | | | | |
|---|---|---|---|---|
| 4,691,273 A | * | 9/1987 | Kuwata et al. ................ | 363/132 |
| 4,833,584 A | * | 5/1989 | Divan ............................ | 363/37 |
| 4,941,076 A | * | 7/1990 | Diaz .............................. | 363/49 |
| 4,992,919 A | * | 2/1991 | Lee et al. ...................... | 363/17 |
| 5,075,836 A | * | 12/1991 | Suzuki et al. ................. | 363/17 |
| 5,099,407 A | * | 3/1992 | Thorne .......................... | 363/37 |
| 5,349,270 A | | 9/1994 | Roll et al. | |
| 5,448,467 A | * | 9/1995 | Ferreira ........................ | 363/17 |
| 5,684,678 A | * | 11/1997 | Barrett .......................... | 363/17 |
| 5,796,215 A | | 8/1998 | Parry et al. | |
| 5,841,240 A | | 11/1998 | Beij et al. | |
| 5,889,373 A | | 3/1999 | Fisher et al. | |
| 5,917,289 A | | 6/1999 | Nerone et al. | |
| 5,925,984 A | | 7/1999 | Fischer et al. | |
| 6,031,339 A | | 2/2000 | Andrews | |
| 6,034,485 A | | 3/2000 | Parra | |
| 6,114,810 A | | 9/2000 | Foo | |
| 6,150,769 A | | 11/2000 | Nerone et al. | |
| 6,194,840 B1 | | 2/2001 | Chang | |
| 6,246,173 B1 | | 6/2001 | Fischer et al. | |
| 6,628,090 B1 | | 9/2003 | Scollo | |
| 6,696,803 B2 | | 2/2004 | Tao et al. | |
| 6,779,411 B1 | * | 8/2004 | Spurgeon .................. | 73/863.23 |
| 6,819,057 B2 | | 11/2004 | Alexandrov | |
| 6,831,423 B2 | * | 12/2004 | Chen ............................ | 315/224 |
| 6,936,973 B2 | | 8/2005 | Parra, Sr. et al. | |
| 2002/0030451 A1 | | 3/2002 | Moisin | |

* cited by examiner

*Primary Examiner* — Rajnikant Patel
(74) *Attorney, Agent, or Firm* — Waddey Patterson; Mark J. Patterson; Gary L. Montle

(57) ABSTRACT

A self-oscillating inverter provides an output voltage with fixed operating frequency and amplitude independently of a load. First and second switching elements are arranged in a half-bridge configuration. A resonant circuit having a primary winding of a resonant inductor and a resonant capacitor is coupled between the switching elements. A clamping circuit limits the voltage across the resonant capacitor to a predetermined maximum value, and along with the resonant capacitor defines a capacitance compensation circuit having an equivalent capacitance greater than that of the resonant capacitor alone, wherein the actual resonant frequency of the inverter is less than the natural frequency of the resonant circuit such that soft-switching is assured. An output voltage across the resonant inductor during steady-state operation is a quasi-square waveform with a fixed amplitude, wherein a load voltage across a secondary winding of the inductor is also a quasi-square waveform with a fixed amplitude.

11 Claims, 4 Drawing Sheets

ELECTRONIC BALLAST WITH LOAD-INDEPENDENT AND SELF-OSCILLATING INVERTER TOPOLOGY

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims benefit of the following patent application(s) which is/are hereby incorporated by reference:
None

BACKGROUND OF THE INVENTION

The present invention relates generally to electronic ballasts for powering discharge lamps. More particularly, the present invention relates to electronic ballasts having a self-oscillating inverter topology that is substantially load-independent in operation.

Dimming and program-start lamp ballasts are well known in the art for their advantageous lighting features. Electronic ballasts are frequently provided for their superior ability to provide such features. Unfortunately, their complexity and resulting cost can be prohibitive for certain applications, as one or more dedicated control circuits such as a microcontroller and/or switch driver integrated circuit are required to provide the desired switching operations. This is particularly the case where more than one lamp is provided for a common light fixture.

Self-oscillating inverter topologies as are known in the art provide for less complexity and therefore lower cost in ballast design, but such topologies tend to be dependent on load condition (i.e., light load, heavy load and most particularly no load) such that the inverter operating frequency changes with variations in the load condition. This can make it difficult to maintain a desired frequency. Without a microprocessor to detect fault conditions and shut down the ballast, it is also desirable if not necessary to provide protection circuitry for circuit components in the event of open load and short load fault conditions. Further, such topologies as are currently known in the art generally include capacitive mode switching (i.e., hard-switching) during transient operation, where inductive mode switching (i.e., soft-switching) is much more desirable to reduce stresses on circuit components.

BRIEF SUMMARY OF THE INVENTION

Various embodiments of a self-oscillating inverter topology are provided herein for lamp ballasts, and more particularly those requiring dimming and program start functionality.

In various embodiments of the inverter as disclosed herein, an operating frequency is substantially independent of load condition. In other various embodiments, an inherent protection function is provided for abnormal operating conditions such as short or open loads.

In various embodiments of the inverter as disclosed herein, inductive switching or soft-switching operation of the inverter switching elements is further provided.

In various embodiments of the inverter as disclosed herein, an inverter output to a load has a square waveform or quasi-square waveform so as maximize filament heating capability as compared to sinusoidal or other waveforms.

In an embodiment, an inverter circuit for a discharge lamp ballast includes first and second switching elements arranged in a half-bridge configuration. A resonant circuit has a primary winding of a resonant inductor coupled on a first end to a node between the first and second switching elements and a resonant capacitor coupled between a second end of the resonant inductor and a negative terminal for the inverter. A clamping circuit is coupled to the resonant capacitor and limits the voltage across the resonant capacitor to a predetermined maximum value. The clamping circuit and the resonant capacitor collectively define a capacitance compensation circuit having an equivalent capacitance greater than the capacitance of the resonant capacitor alone. The actual resonant frequency of the inverter circuit is less than the natural frequency of the resonant circuit whereby soft-switching of the inverter circuit is assured.

In another embodiment, an inverter circuit in accordance with the present invention includes first and second switching elements arranged in a half-bridge configuration. A resonant circuit has a primary winding of a resonant inductor coupled on a first end to a node between the first and second switching elements and a resonant capacitor coupled between a second end of the resonant inductor and a negative terminal for the inverter. A load circuit includes a secondary winding of the resonant inductor which drives a load when an output voltage is generated across the primary winding of the resonant inductor. A diode is arranged with its anode coupled to a node between the resonant capacitor and the primary winding of the resonant inductor and its cathode coupled to a positive terminal of the inverter. The diode clamps the voltage across the resonant capacitor to a predetermined maximum value wherein an output voltage during a steady-state operation across the primary winding and thereby the secondary winding of the resonant inductor is a quasi-square waveform with a fixed amplitude. A starting circuit including at least a second secondary winding of the resonant inductor causes self-oscillation of the first and second switching elements. The operating frequency of self-oscillation in the first and second switching elements is fixed equal to the natural resonant frequency of the resonant circuit regardless of load condition, further wherein a short load condition representative of a missing load in the load circuit causes a short condition in the primary winding of the resonant inductor and interrupts self-oscillation.

In another embodiment, an inverter circuit in accordance with the present invention includes first and second switching elements arranged in a half-bridge configuration between positive and negative terminals of the inverter. A resonant circuit has a primary winding of a resonant inductor coupled on a first end to a node between the first and second switching elements and a resonant capacitor coupled between a second end of the resonant inductor and a negative terminal for the inverter. A load circuit including a secondary winding of the resonant inductor is capable of driving a load when an output voltage is generated across the primary winding of the resonant inductor. A clamping circuit is provided with a first diode having its anode coupled to a node between the resonant capacitor and the primary winding of the resonant inductor and its cathode coupled to the positive terminal, and a second diode having its cathode coupled to that same node and its anode coupled to the negative terminal. A starting circuit includes at least a second secondary winding of the resonant inductor and causes self-oscillation of the first and second switching elements.

DETAILED DESCRIPTION OF THE INVENTION

Figure 1:
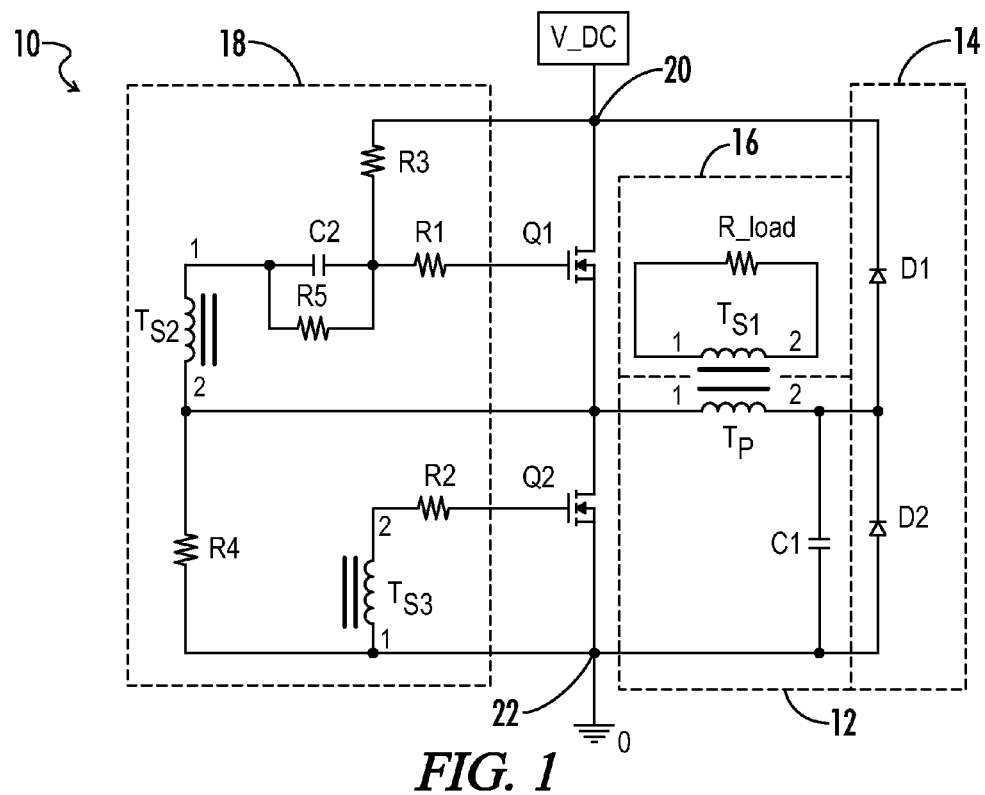
FIG. 1 is a circuit diagram showing an embodiment of an inverter topology in accordance with the present invention.
Figure 2:
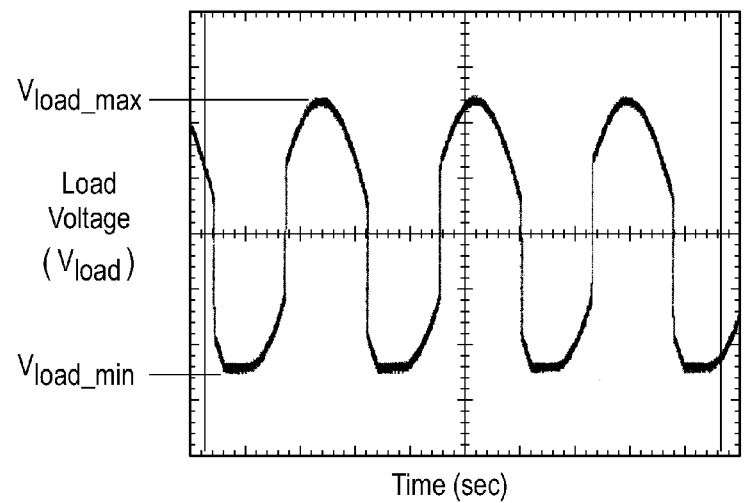
FIG. 2 is a waveform chart representing a load voltage generated by the inverter topology of FIG. 1.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

The term "coupled" means at least either a direct electrical connection between the connected items or an indirect connection through one or more passive or active intermediary devices.

The term "circuit" means at least either a single component or a multiplicity of components, either active and/or passive, that are coupled together to provide a desired function.

The term "signal" means at least one current, voltage, charge, temperature, data or other signal.

The terms "switching element" and "switch" may be used interchangeably and may refer herein to at least: a variety of transistors as known in the art (including but not limited to FET, BJT, IGBT, JFET, etc.), a switching diode, a silicon controlled rectifier (SCR), a diode for alternating current (DIAC), a triode for alternating current (TRIAC), a mechanical single pole/double pole switch (SPDT), or electrical, solid state or reed relays. Where either a field effect transistor (FET) or a bipolar junction transistor (BJT) may be employed as an embodiment of a transistor, the scope of the terms "gate," "drain," and "source" includes "base," "collector," and "emitter," respectively, and vice-versa.

Terms such as "providing," "processing," "supplying," "determining," "calculating" or the like may refer at least to an action of a computer system, computer program, signal processor, logic or alternative analog or digital electronic device that may be transformative of signals represented as physical quantities, whether automatically or manually initiated.

Referring generally to FIGS. 1-5, various embodiments of an inverter topology for a lamp ballast are described herein. Generally stated, an inverter in accordance with the present invention includes a pair of switching elements in a half-bridge configuration, a resonant circuit coupled to the switching elements and effective to provide an inverter output voltage to a load circuit, a clamping circuit coupled to the resonant circuit and effective to fix an operating frequency of the switching elements and further to clamp the output voltage to a constant quasi-square waveform with a predetermined amplitude, and a starting circuit to provide self-oscillation of the switching elements during a steady-state operation of the inverter. Where the various figures may describe embodiments sharing various common elements and features with other embodiments, similar elements and features are given the same reference numerals and redundant description thereof may be omitted below.

Referring first to FIG. 1, an inverter 10 in accordance with an embodiment of the present invention includes first and second switching elements Q1, Q2 arranged in a half-bridge configuration between a DC power source (V_DC), such as for example the output from a power factor correction (PFC) circuit, and an inverter ground (0). A connection between the first switching element Q1 and the DC power source V_DC may, as described herein, further define a positive terminal 20 for the inverter 10, and a connection between the second switching element Q2 and the inverter ground 0 may, as described herein, further define a negative terminal 22 for the inverter 10.

A resonant circuit 12 is coupled to a node between the first and second switching elements Q1, Q2, with the resonant circuit 12 as shown including a primary (first) winding Tp of a resonant inductor coupled on a first end to the node between the switching elements Q1, Q2 and a resonant capacitor C1 coupled to the second end of the primary winding Tp and to the negative terminal 22 for the inverter 10. The resonant circuit 12 has a natural resonant frequency (f_res) based upon values for the resonant inductor and the resonant capacitor (wherein $f\_res = \frac{1}{2} * n * \sqrt{(Tp * C1)}$) and generates an output voltage Vout which is provided to a load circuit 16 including a secondary (second) winding Ts1 of the resonant inductor. A load voltage Vload based on the output voltage Vout may be effective to drive a load coupled to the load circuit 16, which in various embodiments may be one or more filaments or electrodes of a lighting device such as a discharge lamp. The load voltage Vload may thus provide filament heating during a dimming or program start operation as known in the art.

A clamping circuit 14 is coupled to the resonant circuit 12 and is effective to clamp or otherwise limit the output voltage to a predetermined value whereby the output voltage and the load voltage have quasi-square waveforms regardless of the load condition. The clamping circuit 14 as shown in FIG. 1 includes a first diode D1 having its cathode coupled to the positive terminal 20 for the inverter 10 and its anode coupled to a node between the primary winding of the resonant inductor Tp and the resonant capacitor C1, and a second diode D2 having its cathode coupled to the node between the primary winding of the resonant inductor Tp and the resonant capacitor C1 and its anode coupled to the negative terminal 22 for the inverter 10.

A starting circuit 18 in an embodiment as shown in FIG. 1 includes second and third secondary windings Ts2, Ts3 of the resonant inductor (or alternatively stated third and fourth windings of the resonant inductor generally) which provide auxiliary feedback from the resonant circuit. The secondary winding Ts2 is arranged to drive the first switching element Q1 and the secondary winding Ts3 is arranged to drive the second switching element Q2. Resistors R3, R4, R5 and capacitor C2 are arranged to help the switching elements Q1, Q2 to begin oscillating as further described below, and resistors R1, R2 may be small resistors which are arranged to reduce the oscillation on the gate drive.

An example of operation of the inverter topology 10 as shown in FIG. 1 may now be described in some greater detail. Initially the DC power source V_DC may charge up the capacitor C2 in the starting circuit through the resistors R3, R4, R5 to a value predetermined by the ratio of (R5/(R3+R4+R5)). The voltage across the capacitor C2 in various embodiments may be designed to turn on the first switching element Q1 first. Once the first switching element Q1 turns on, oscillation is initiated by the resonant circuit at the natural resonant frequency determined by the values of the resonant components Tp, C1.

The voltage across the resonant capacitor C1 is clamped at maximum and minimum values (e.g., 500 Vmax and 0 Vmin). The voltage across the primary winding of the resonant inductor Tp will in this case be from 500 Vmax to −500 Vmin according to the voltage balance. As soon as the voltage across the primary winding of the resonant inductor Tp goes negative, the secondary winding Ts2 turns off the first switching element Q1. When the voltage across the primary winding of the resonant inductor Tp reaches a value (−N*Vth, where N is the turns ratio between the primary winding Tp, the secondary winding Ts2 and the secondary winding Ts3 of the resonant inductor, and Vth is the turn-on threshold voltage for the switching elements Q1, Q2) the voltage across the secondary winding Ts3 will turn on the second switching element Q2.

After the second switching element Q2 is turned on, the resonant circuit (Tp, C1) will continue oscillation of the switching elements Q1, Q2 at the natural resonant frequency. When the voltage across the primary winding of the resonant inductor Tp becomes positive the secondary winding Ts3 will turn off the second switching element Q2. When the voltage across the primary winding of the resonant inductor Tp reaches a value (N*Vth, the components as described above) the voltage across the secondary winding Ts2 turns on the first switching element Q1 and the inverter reaches a steady-state oscillating mode.

In the steady-state mode, the voltage across the primary winding of the resonant inductor Tp will be a quasi-square waveform with a fixed amplitude because the voltage across the resonant capacitor C1 is clamped by the clamping circuit 14. As a result, the voltage across the secondary winding Ts1 and the load R_load is also a quasi-square waveform with fixed amplitude as further represented in FIG. 2.

In various embodiments the clamping circuit components D1, D2 and the resonant capacitor C1 may be described as further defining automatic capacitance compensation circuit. The equivalent capacitance (Ceq) of the capacitance compensation circuit will be much larger than the value of the resonant capacitor C1, such that the actual resonant frequency of the capacitance compensation circuit and thereby the inverter itself will be less than the natural frequency of the resonant circuit:

$$[\tfrac{1}{2}*\pi*\sqrt{(Tp*C1)}] > [\tfrac{1}{2}*\pi*\sqrt{(Tp*Ceq)}]$$

This feature substantially ensures an inductive switching or soft-switching operation of the switching elements in the inverter.

Further, the operating frequency in an embodiment as described above may generally be equal to the natural resonant frequency of the resonant circuit, regardless of the load condition (i.e., whether or not there is an open circuit at the load). When there is no load present, or R_load is otherwise a short circuit representing an abnormal operating condition, the circuit will not be able to initiate oscillation because the primary winding of the resonant inductor Tp is effectively shorted in such a case.

Because the voltage across the primary winding of the resonant inductor Tp is clamped, the voltage across the gate drive windings (secondary windings Ts2, Ts3) is clamped as well, and as a result no protection devices are needed to provide sufficient protection for the gates of the switching elements Q1, Q2.

Figure 3:
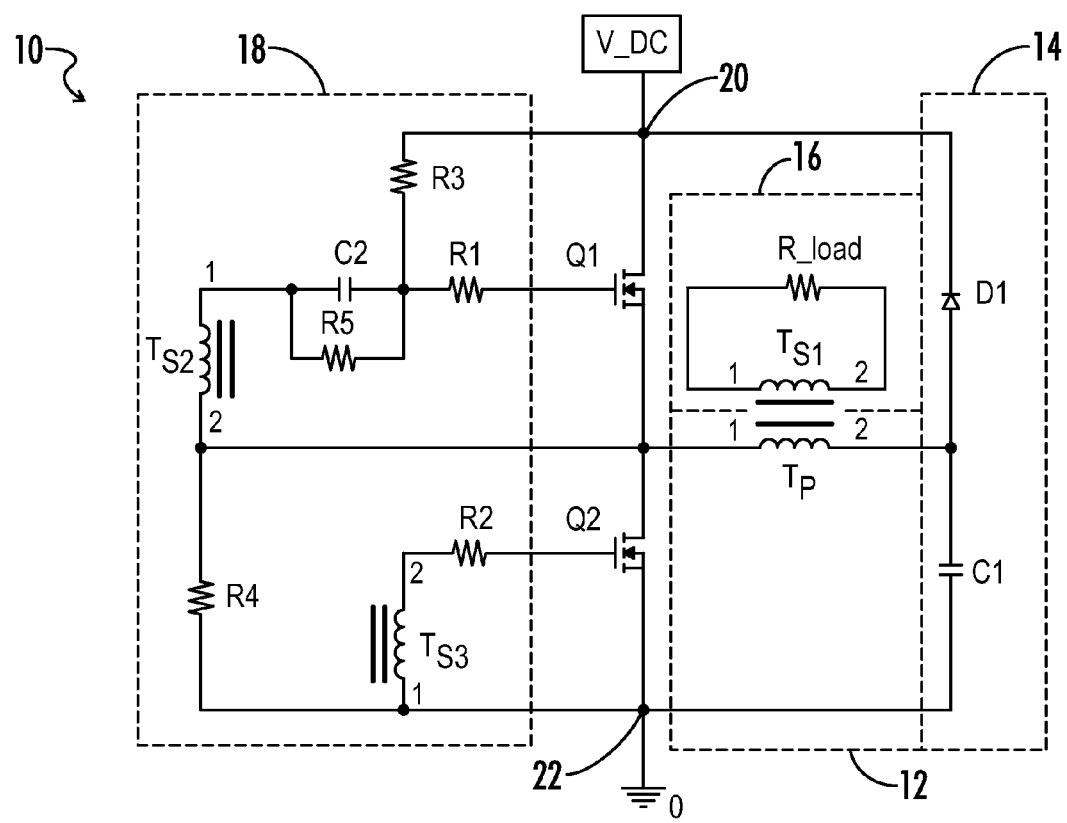
FIG. 3 is a circuit diagram showing an alternative embodiment of an inverter topology in accordance with the present invention.

Referring now to FIG. 3, in another embodiment the inverter topology 10 is similar to that represented in FIG. 1, except that the clamping circuit 14 includes only a single diode D1 between the resonant capacitor C1 and the positive terminal 20 of the inverter 10.

In embodiments as shown in FIGS. 1 and 3, both of the switching elements Q1, Q2 may be N-channel MOSFETs.

Figure 4:
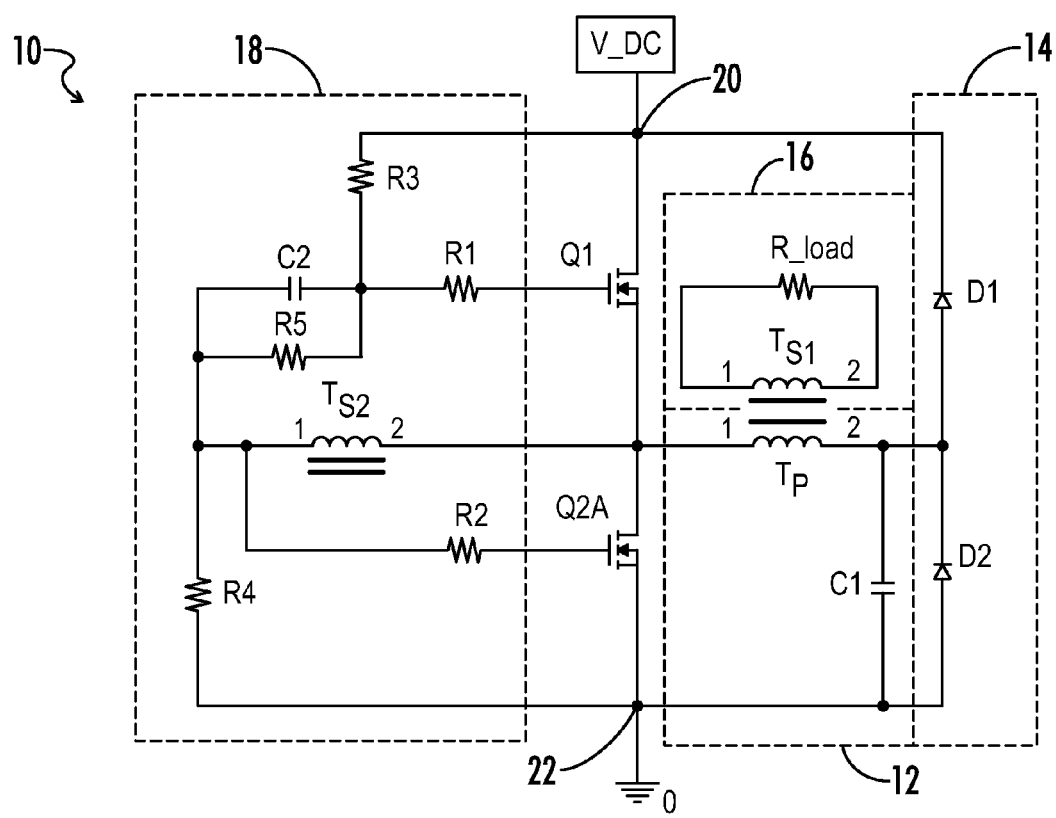
FIG. 4 is a circuit diagram showing another alternative embodiment of an inverter topology in accordance with the present invention.

Referring now to FIG. 4, in another embodiment the inverter topology is similar to that represented in FIG. 1, except that the lower side switching element (the second switching element Q2) is a P-channel MOSFET. The starting circuit 18 is further modified in such an embodiment, whereby the secondary windings Ts2, Ts3 as shown in FIG. 1 are replaced with a single secondary winding Ts2 as shown in FIG. 4. The secondary winding Ts2 is coupled on a first end to the node between the switching elements Q1, Q2, and is coupled on a second end to the gate of the first switching element Q1 and to the gate of the second switching element Q2.

Figure 5:
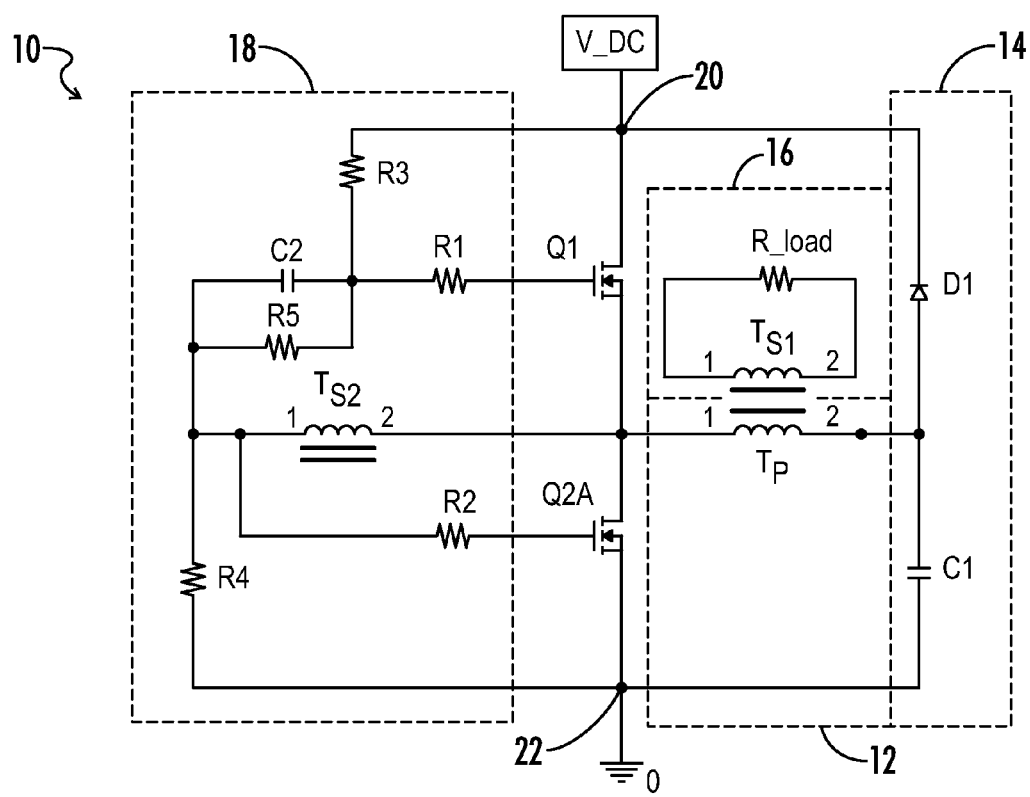
FIG. 5 is a circuit diagram showing another alternative embodiment of an inverter topology in accordance with the present invention.

Referring now to FIG. 5, in another embodiment the inverter topology 10 is similar to that represented in FIG. 4, except that the clamping circuit 14 includes only a single diode D1 between the resonant capacitor C1 and the positive terminal 20 of the inverter 10.

The previous detailed description has been provided for the purposes of illustration and description. Thus, although there have been described particular embodiments of the present invention of a new and useful "Electronic Ballast with Load-Independent and Self-Oscillating Inverter Topology," it is not intended that such references be construed as limitations upon the scope of this invention except as set forth in the following claims.

What is claimed is:

1. An inverter comprising:
   first and second switching elements arranged in a half-bridge configuration;
   a resonant circuit having a primary winding of a resonant inductor coupled on a first end to a node between the first and second switching elements and a resonant capacitor coupled between a second end of the resonant inductor and a negative terminal for the inverter;
   a load circuit comprising a secondary winding of the resonant inductor effective to drive a load when an output voltage is generated across the primary winding of the resonant inductor;
   a diode having its anode coupled to a node between the resonant capacitor and the primary winding of the resonant inductor and its cathode coupled to a positive terminal of the inverter, the diode effective to clamp the voltage across the resonant capacitor to a predetermined maximum value wherein an output voltage during a steady-state operation across the primary winding and thereby the secondary winding of the resonant inductor is a quasi-square waveform with a fixed amplitude; and
   a starting circuit having at least a second secondary winding of the resonant inductor and effective to cause self-oscillation of the first and second switching elements, the starting circuit further effective to fix the operating frequency of self-oscillation in the first and second switching elements equal to the natural resonant frequency of the resonant circuit regardless of a load condition.

2. The inverter of claim 1, the starting circuit further effective to interrupt self-oscillation in response to a short load condition in the load circuit.

3. The inverter of claim 1, the diode and the resonant capacitor collectively defining a capacitance compensation circuit having an equivalent capacitance greater than the capacitance of the resonant capacitor alone, wherein the actual resonant frequency of the inverter circuit is less than the natural frequency of the resonant circuit.

4. The inverter of claim 1, the first and second switching elements further comprising N-channel MOSFETs, and the starting circuit further comprising second and third secondary windings of the resonant inductor coupled to the gates of the first and second switching elements, respectively.

5. The inverter of claim 1, the first switching element further comprising an N-channel MOSFET and the second switching element further comprising a P-channel MOSFET, and the starting circuit further comprising a second secondary winding of the resonant inductor having a first end coupled to the node between the first and second switching elements and a second end coupled to the gates of the first and second switching elements.

6. An inverter comprising:
first and second switching elements arranged in a half-bridge configuration between positive and negative inverter terminals;
a resonant circuit having a primary winding of a resonant inductor coupled on a first end to a node between the first and second switching elements and a resonant capacitor coupled between a second end of the resonant inductor and the negative inverter terminal;
a load circuit comprising a secondary winding of the resonant inductor effective to drive a load when an output voltage is generated across the primary winding of the resonant inductor;
a clamping circuit further comprising a first diode having its anode coupled to a node between the resonant capacitor and the primary winding of the resonant inductor and its cathode coupled to the positive inverter terminal, and a second diode having its cathode coupled to said node and its anode coupled to the negative terminal; and a starting circuit having at least a second secondary winding of the resonant inductor and effective to cause self-oscillation of the first and second switching elements.

7. The inverter of claim 6, the clamping circuit effective to clamp the voltage across the resonant capacitor to a predetermined maximum value wherein an output voltage during a steady-state operation across the primary winding and thereby the secondary winding of the resonant inductor is a quasi-square waveform with a fixed amplitude.

8. The inverter of claim 6, the clamping circuit and the resonant capacitor collectively defining a capacitance compensation circuit having an equivalent capacitance greater than the capacitance of the resonant capacitor alone, wherein the actual resonant frequency of the inverter circuit is less than the natural frequency of the resonant circuit.

9. The inverter of claim 6, the starting circuit effective to fix an operating frequency of self-oscillation in the first and second switching elements equal to the natural resonant frequency of the resonant circuit regardless of a load condition, and further effective to interrupt self-oscillation in response to a short load condition representative of a missing load in the load circuit.

10. The inverter of claim 6, the first and second switching elements further comprising N-channel MOSFETs, and the starting circuit further comprising second and third secondary windings of the resonant inductor coupled to the gates of the first and second switching elements, respectively.

11. The inverter of claim 7, the first switching element further comprising an N-channel MOSFET and the second switching element further comprising a P-channel MOSFET, and the starting circuit further comprising a second secondary winding of the resonant inductor having a first end coupled to the node between the first and second switching elements and a second end coupled to the gates of the first and second switching elements.

* * * * *